(12) United States Patent
Howland

(10) Patent No.: US 8,291,808 B2
(45) Date of Patent: Oct. 23, 2012

(54) TITANIUM MOSAIC BODY ARMOR ASSEMBLY

(75) Inventor: Charles A Howland, Temple, NH (US)

(73) Assignee: Warwick Mills, Inc., New Ipswich, NH (US)

( * ) Notice: Subject to any disclaimer, the term of this patent is extended or adjusted under 35 U.S.C. 154(b) by 74 days.

(21) Appl. No.: 13/082,442

(22) Filed: Apr. 8, 2011

(65) Prior Publication Data

US 2011/0296979 A1   Dec. 8, 2011

Related U.S. Application Data

(60) Provisional application No. 61/321,904, filed on Apr. 8, 2010, provisional application No. 61/413,146, filed on Nov. 12, 2010.

(51) Int. Cl.
*F41H 5/04* (2006.01)
*F41H 1/00* (2006.01)

(52) U.S. Cl. ............ 89/36.02; 89/38.05; 2/2.5; 428/911

(58) Field of Classification Search ...... 89/36.01–36.05; 428/911; 2/2.5; 109/49.5
See application file for complete search history.

(56) References Cited

U.S. PATENT DOCUMENTS

| | | | |
|---|---|---|---|
| 2,771,384 A | 11/1956 | Collins | |
| 2,942,327 A | 6/1960 | Corry | |
| 3,130,414 A | 4/1964 | Bailey et al. | |
| 3,826,172 A | 7/1974 | Dawson | |
| 3,945,042 A | 3/1976 | Lobo | |
| 4,090,011 A | 5/1978 | Barkman et al. | |
| 4,198,707 A | 4/1980 | Haupt et al. | |
| 2,640,987 A | 6/1983 | Ehlers | |
| 4,574,105 A | 3/1986 | Donovan | |
| 4,660,223 A | 4/1987 | Fritch | |
| 4,911,061 A | 3/1990 | Pivett et al. | |
| 5,102,723 A | 4/1992 | Pepin | |
| 5,175,040 A | 12/1992 | Harpell et al. | |

(Continued)

FOREIGN PATENT DOCUMENTS

EP   0933612 A2   8/1999

(Continued)

OTHER PUBLICATIONS

Anderson, Charles E., An Examination of Long-Rod Penetration, Int. J. Impact Engng vol. 11, No. 4, 1991, pp. 481-501.

(Continued)

*Primary Examiner* — Michael David
(74) *Attorney, Agent, or Firm* — Maine Cernota & Rardin

(57) ABSTRACT

An assembly useful for constructing concealable, flexible, lightweight protective body armor includes a flexible support layer to which is bonded a mosaic of rigid, adjacent tiles having a high bending performance, such as type 5 titanium alloy, which includes 6% aluminum and 4% vanadium by weight. The inner support layer can include woven para-aramid and/or STF-treated Kevlar™. The tiles can have interlocking and/or thickened edges. An additional backing layer can include para-aramid and/or carbon nanofiber embedded UHMWPE UD-laminate. An inner layer can have high moisture transport, anti-microbial properties, and low friction. An outer layer can be shaped with anatomical features to hide the armor. The assembly can be flame resistant. Assemblies with 2 mm thick tiles and total thickness less than 5 mm can provide V50 protection against 9 mm FMJ projectiles at more than 1000 feet/second, and can also protect against knife and spike assaults at 65 Joules force.

31 Claims, 12 Drawing Sheets

U.S. PATENT DOCUMENTS

| | | | |
|---|---|---|---|
| 5,185,195 | A | 2/1993 | Harpell et al. |
| 5,191,166 | A | 3/1993 | Smirlock et al. |
| 5,196,252 | A | 3/1993 | Harpell |
| 5,198,280 | A | 3/1993 | Harpell et al. |
| 5,254,383 | A | 10/1993 | Harpell et al. |
| 5,326,249 | A | 7/1994 | Weissfloch |
| 5,362,527 | A | 11/1994 | Harpell et al. |
| 5,364,679 | A | 11/1994 | Groves |
| 5,565,264 | A | 10/1996 | Howland |
| 5,591,933 | A | 1/1997 | Li et al. |
| 5,601,895 | A | 2/1997 | Cunningham |
| 5,619,748 | A | 4/1997 | Nelson et al. |
| 5,668,344 | A | 9/1997 | Bornstein |
| 5,824,940 | A | 10/1998 | Chediak et al. |
| 5,827,608 | A | 10/1998 | Rinehart et al. |
| 5,837,623 | A | 11/1998 | Howland |
| 5,853,547 | A | 12/1998 | Aherns et al. |
| 5,882,357 | A | 3/1999 | Sun et al. |
| 5,891,379 | A | 4/1999 | Bhattacharyya et al. |
| 5,976,996 | A | 11/1999 | Howland |
| 6,035,438 | A | 3/2000 | Neal et al. |
| 6,077,319 | A | 6/2000 | Sun et al. |
| 6,266,818 | B1 | 7/2001 | Howland et al. |
| 6,510,777 | B2 | 1/2003 | Neal |
| 6,534,426 | B1 | 3/2003 | Chiou |
| 6,543,055 | B2 | 4/2003 | Howland et al. |
| 6,548,430 | B1 | 4/2003 | Howland |
| 6,612,217 | B1 | 9/2003 | Shockey et al. |
| 6,627,562 | B1 | 9/2003 | Gehring, Jr. |
| 6,668,868 | B2 | 12/2003 | Howland et al. |
| 6,693,052 | B2 | 2/2004 | Howland |
| 6,720,277 | B1 | 4/2004 | Howland |
| 6,743,498 | B2 | 6/2004 | Fourmeux |
| 6,770,287 | B1 | 8/2004 | Sun et al. |
| 6,834,685 | B2 | 12/2004 | Hannigan et al. |
| 6,840,288 | B2 | 1/2005 | Zhu et al. |
| 6,911,247 | B2 | 6/2005 | Howland |
| 6,998,165 | B2 | 2/2006 | Howland |
| 7,007,308 | B1 | 3/2006 | Howland et al. |
| 7,115,315 | B2 | 10/2006 | Fowler |
| 7,192,498 | B2 | 3/2007 | Howland |
| 7,393,588 | B1 | 7/2008 | Howland |
| 2002/0069444 | A1 | 6/2002 | Graham et al. |
| 2002/0106956 | A1* | 8/2002 | Howland ............ 442/208 |
| 2002/0111099 | A1* | 8/2002 | Howland ............ 442/181 |
| 2002/0122927 | A1 | 9/2002 | Howland |
| 2002/0124904 | A1* | 9/2002 | Howland et al. ........ 139/420 R |
| 2003/0159575 | A1 | 8/2003 | Reichman |
| 2003/0228815 | A1 | 12/2003 | Bhatnagar et al. |
| 2005/0118716 | A1 | 6/2005 | Howland et al. |
| 2005/0197024 | A1 | 9/2005 | Howland |
| 2005/0255776 | A1* | 11/2005 | Howland ............ 442/286 |
| 2005/0288797 | A1 | 12/2005 | Howland |
| 2006/0005305 | A1 | 1/2006 | Haskell |
| 2006/0014457 | A1 | 1/2006 | Newton et al. |
| 2006/0068158 | A1 | 3/2006 | Howland |
| 2007/0016996 | A1 | 1/2007 | Seitzinger et al. |
| 2007/0054817 | A1 | 3/2007 | Li et al. |
| 2007/0099526 | A1 | 5/2007 | Heerden et al. |
| 2007/0238379 | A1 | 10/2007 | Bhatnagar et al. |
| 2008/0032084 | A1 | 2/2008 | Biermann et al. |
| 2008/0087161 | A1 | 4/2008 | Dean et al. |
| 2008/0104735 | A1 | 5/2008 | Howland |
| 2008/0160855 | A1* | 7/2008 | Howland ............ 442/341 |
| 2009/0255022 | A1 | 10/2009 | Smith |
| 2009/0293711 | A1* | 12/2009 | Altergott et al. ........ 89/36.02 |
| 2012/0152098 | A1* | 6/2012 | Howland et al. ........ 89/36.02 |
| 2012/0159680 | A1* | 6/2012 | Howland ............ 2/2.5 |

FOREIGN PATENT DOCUMENTS

| | | |
|---|---|---|
| EP | 0967453 A1 | 12/1999 |
| KR | 1020100004357 A | 1/2010 |
| WO | 9220520 A1 | 11/1992 |
| WO | 0033013 | 6/2000 |
| WO | 0210667 A2 | 2/2002 |
| WO | 03057462 A1 | 7/2003 |
| WO | 2005044559 | 5/2005 |

OTHER PUBLICATIONS

Anderson, Charles E., Long-Rod Penetration, Target Resistance, and Hypervelocity Impact, Int. J. Impact Engng vol. 14, No. 1-4, 1993, pp. 1-12.

Walker, James, A Time-Dependent Model for Long-Rod Penetration, Int. J. Impact Engng vol. 16, No. 1, pp. 19-48, 1995.

PCT Search Report for PCT Application No. PCT/US2008-081688, Jun. 16, 2009, 1 page.

Anderson, Charles E. Jr., et al., "On the Hydrodynamic Approximation for Long-Rod Penetration", International Journal of Impact Engineering, 1999, pp. 23-43 (21 pgs), vol. 22.

Kleponis, David S., et al., Material Design Paradigms for Optimal Functional Gradient Armors, Mar. 13, 2000, 6 pages.

European Examination Report for EP Application No. 01994286.1, dated Oct. 1, 2007, 7 pgs.

European Examination Report for EP Application No. 01994286.1, dated May 15, 2009, 3 pgs.

European Examination Report for EP Application No. 01994286.1, dated Aug. 16, 2010, 4 pgs.

European Examination Report for EP Application No. 04796627.0, Jul. 13, 2010, 8 pgs.

European Examination Report for EP Application No. 04796627.0, Mar. 28, 2011, 7 pgs.

European Search Report for EP Application No. 05724858, Mar. 25, 2010.

European Supplementary Partial Search Report for EP Application No. 01994286, dated Jan. 10, 2005, 4 pgs.

PCT Search Report dated Aug. 22, 2008 of Patent Application No. PCT/US07/67878 filed May 1, 2007, 1 pg.

PCT International Search Report dated Jun. 28, 2002 of International Appl. No. PCT/US01/48947 filed Dec. 13, 2001.

European Search Report for EP Application No. 04796627.0, Mar. 15, 2010, 4 pages.

PCT Search Report for App. No. PCT/US04/35784, dated Mar. 7, 2005.

PCT Search Report for PCT Application No. PCT/US2005/07402, Aug. 7, 2006, 1 page.

PCT Search Report and Written Opinion for PCT Application No. PCT/US2011/031656, Feb. 8, 2012, 14 pages.

* cited by examiner

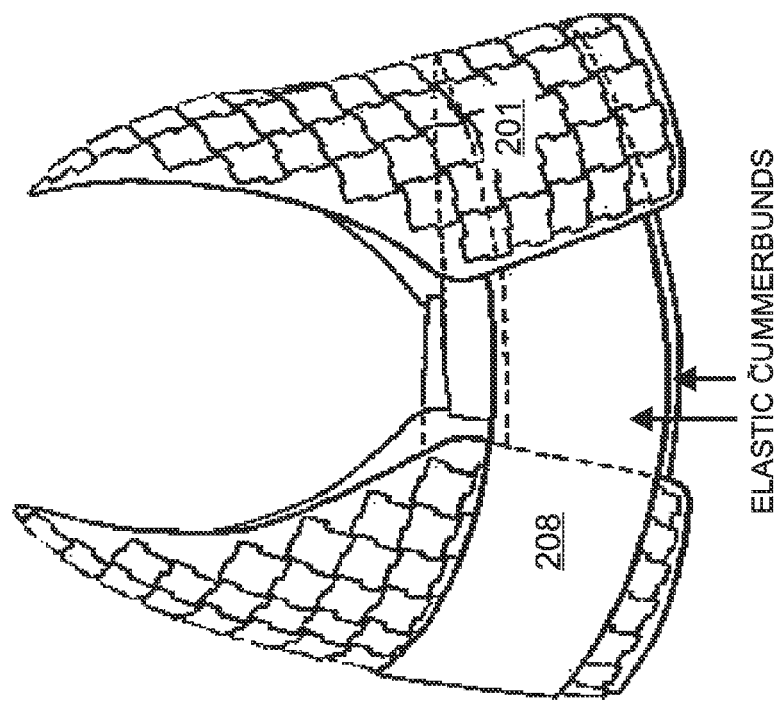
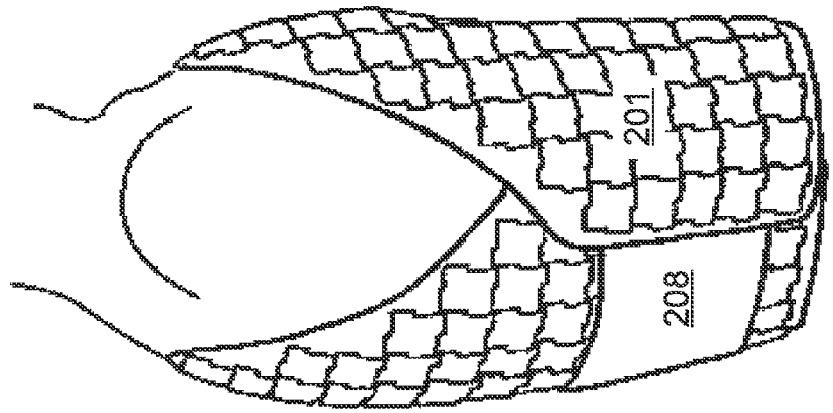
Figure 2C
Figure 2D

TITANIUM MOSAIC BODY ARMOR ASSEMBLY

RELATED APPLICATIONS

This application claims the benefit of U.S. Provisional Applications No. 61/321,904, filed Apr. 8, 2010, and No. 61/413,146, filed Nov. 12, 2010. Both of these applications are herein incorporated by reference in their entirety for all purposes.

FIELD OF INVENTION

The invention relates to body armor, and in particular to flexible, concealable, lightweight body armor for protection against threats from typical military and terrorist hand-held weapons.

BACKGROUND

In general, body armor must provide protection to the user, while at the same time not unduly hindering the movements of the user and not requiring the user to carry unreasonably excess weight. In addition, it is often important that body armor be concealable, so that enemy combatants, terrorists, criminals, or other antagonists are not prompted to selectively direct their attacks toward unprotected parts of the body.

These requirements can significantly limit the use of body armor, and the degree of protection that acceptable body armor can provide. In particular, concealable body armor is typically not adequate for protecting foot soldiers in combat. A standard test often used to simulate hand-weapon threats from terrorists and enemy soldiers is an impact from a round nose, 124 grain, 9 mm "full metal jacket" ("FMJ") projectile traveling at 1000 feet-per-second or faster. Conventional torso armor provided by the military for protection against such threats is not typically concealable, since it tends to create a visible bulge that can be easily detected by antagonists. In addition, these solutions cannot be extended to the arms and legs of a foot soldier without significantly limiting the user's freedom of movement and burdening the user with excess weight.

For military applications, the carry loads for modern infantry and tactical operations are so high that additional extremity protection is only used under very limited circumstances. In general, the current approach to extremity protection is to model the extremity protective panels after the fabric panels found in the ballistic vest. This approach leads to a typical weight of 0.5-1 lb/ft$^2$ (72-144 oz/yd$^2$), and a thickness of up to 2 cm and more.

One promising approach to providing flexible, thin, lightweight body armor is to bond tiles made from rigid, protective materials such as metals and/or ceramics to a support fabric. The tiles are bonded in a nearly continuous, adjoining mosaic pattern. Examples are disclosed in U.S. Pat. No. 7,393,588 and US publication 2008-0104735 A1, previously filed by the present inventor, and incorporated herein by reference for all purposes.

However, until the present invention such mosaic armor systems only demonstrated good projectile protection when the thickness of the tiles was at least roughly equal to the thickness of the projectile. The accepted wisdom in the art at the time of the present invention regarding the most effective configurations for hard armor is illustrated by the work on penetration mechanics by Anderson and Walker (see for example Int. J. Impact Engng Vol. 11, No. 4, 1991, pp 481-501, Int. J. Impact Engng Vol. 14, No. 1-4, 1993, pp 1-12, and Int. J. Impact Engng Vol. 16, No. 1, pp. 19-48, 1995, incorporated herein by reference for all purposes). Before the present invention, the inventor collaborated with Dr. Anderson of Southwest Research Institute (SwRI) on ceramic mosaic designs. In this work, the armor models from SwRI and our ballistic testing demonstrated that hard armor thickness should be roughly equal to the caliber of the projectiles. For 7.62 mm caliber weapons, ceramic armor performed best when it had a thickness of at least 7 mm. The penetration mechanics showed that this 1:1 ratio was the transition between bending and plug-failure modes in armor.

In other tests, steel tiles having a thickness of 9 mm provided V50 performance for a round nose, 124 grain, 9 mm "full metal jacket" ("FMJ") projectile traveling at 1000 feet-per-second or faster, but the V50 performance declined rapidly as the thickness of the tiles fell below 9 mm. Unfortunately, mosaic armor fashioned from 9 mm thick steel or ceramic tiles is impractical for many applications because of the weight of the tiles and the difficulty of concealing such thick tiles.

A body armor assembly is therefore needed which can be used for constructing concealable body armor which is sufficiently flexible, light in weight, and thin so as to be worn for extended periods without undue weight burden, and without undue restriction of a user's movements, while protecting the user against typical threats from military and terrorist "assault" weapons, such as a 9 mm projectile traveling at 1000 feet-per-second or faster.

SUMMARY OF THE INVENTION

The invention is a body armor assembly comprising tiles having a "specific strength" greater than 0.42 (in units of cube root of kpsi) bonded to a flexible support fabric in an adjoining, mosaic pattern. Specific strength is a new metric used to characterize bending performance of a ballistic material, and is discussed in more detail below. In embodiments, the tiles are made from "grade 5" or "type 5" titanium alloy, which contains 6% aluminum and 4% vanadium, herein also designated as "TiAl6V4." In various embodiments, the tiles are approximately 2 mm thick, and the thickness of the complete armor assembly is approximately 4.5 mm thick.

The utility of the present invention was unexpected and could not be anticipated in light of the teachings and examples provided by the prior art, including examples provided in U.S. Pat. No. 7,393,588 and US publication 2008-0104735 A1, filed by the present inventor and incorporated herein by reference for all purposes. Tests performed on body armor assemblies constructed according to these prior art teachings, using tiles made from high grade steel and a variety of other metal and ceramic materials, either separately or combined, had consistently indicated that V50 performance at velocities approaching 1000 feet-per-second could only be achieved if the thickness of the tiles was at least approximately equal to the diameter of the projectile.

In addition, as discussed above, it was the accepted wisdom in the art as exemplified by the work of Anderson and Walker that adequate ballistic protection required a material thickness roughly equal to the diameter of the projectile. Therefore, due to the sheer number and variety of candidate materials which could be tested for ballistic performance, it was highly unlikely at the time of the present invention that continued testing of materials without any new insight to guide the selection of new candidate materials would ever succeed in providing a better ballistic solution than what had already been identified. Instead, it was necessary to develop a new understanding of the material properties which govern ballistic performance before appropriate new candidate ballistic materials could be identified.

In making the present invention, the inventor realized that the effectiveness of a ballistic material is directly related to its resistance to bending, since bending is the type of loading that is imposed on a material by a ballistic impact. The inventor further realized that because bending performance is proportional to the cube of plate thickness, a new metric which is equal to the cube root of the elastic modulus of the material divided by its specific gravity should be used for characterizing the performance of a ballistic material. This new metric is referred to herein as "specific strength" of a ballistic material, and can be expressed in units of the cube root of kpsi.

Embodiments of the present invention further include an outer cover layer that takes on the silhouette of the morphology of a human torso, thereby masking the outline of the edges of the body armor with the expected lines of the shoulder blades and chest. This outer layer serves to camouflage the unnatural profile of a protective garment made from a body armor assembly. In some embodiments, the outer layer is made of a textile-supported foam or gel, and in certain embodiments the outer layer has tapered edges for even better concealment of the body armor.

Some embodiments include an inner layer having anti-microbial and/or high moisture transport properties, and certain embodiments include an outer layer having low friction and high stretch. Anti-microbial properties can be provided, for example, by treatment of the inner layer with a hydantoin compound which can be treated with a chlorine solution so as to form chloramine.

Various garment embodiments of the present invention include flame resistant material which encapsulates any flammable materials, and in some embodiments seaming and flame-resistant coatings are also included.

The claimed armor assembly is constructed according to methods known in the art, including the teachings of U.S. Pat. No. 7,393,588 and US publication 2008-0104735 A1, previously filed by the present inventor and incorporated herein by reference for all purposes. However, the use of high "specific strength" materials such as "type 5" titanium tiles provides the unexpected result of resisting penetration by high speed projectiles which are much larger in diameter than the thickness of the tiles. For example, embodiments of the present invention which include type 5 titanium tiles of only 2 mm thickness provide V50 performance for a round nose, 124 grain, 9 mm "full metal jacket" ("FMJ") projectile traveling at 1000 feet-per-second or faster.

One general aspect of the present invention is an assembly for constructing body armor. The assembly includes a flexible support layer and a plurality of rigid tiles bonded to the flexible support layer in a substantially adjacent pattern so as to form a mosaic protection layer, the rigid tiles being made of a metal having an ultimate strength of >100 kpsi with elongation >10%, a specific gravity of <6, and a specific strength of >0.42.

In embodiments, the rigid tiles are made of a titanium alloy comprising about approximately 6% aluminum and 4% vanadium by weight. In some embodiments the support layer includes woven para-aramid. In other embodiments the support layer includes STF-treated Kevlar™.

Certain embodiments further include a backing layer. In some of these embodiments the backing layer includes sheer thickening fluid treated para-aramid. In other of these embodiments the backing layer includes ultra-high molecular weight polyethylene (UHMWPE) UD-laminate. In still other of these embodiments the backing layer includes carbon nanotubes.

Various embodiments further include an inner layer having anti-microbial properties. In some of these embodiments the anti-microbial properties arise at least partly from bonding a hydantoin compound to a surface of the inner layer, the hydantoin being treatable with a chlorine solution so as to form chloramine. In other of these embodiments the inner layer includes high moisture transport properties.

In certain embodiments the inner layer includes a low friction, high-stretch layer. In some embodiments the tiles are about approximately 2 mm thick. in other embodiments the tiles are one of square, rectangular, triangular, and hexagonal.

In various embodiments the largest dimension of the tiles is between 10 mm and 50 mm. In certain embodiments the assembly has a thickness of less than 5 mm. In some embodiments the assembly is able to resist penetration by a round nose, 124 grain, 9 mm "full metal jacket" ("FMJ") projectile with a V50 of at least 1000 feet-per-second. And in other embodiments the assembly is able to resist P1A Knife and Spike assaults at 65 Joules force (Level 3 E2) with no penetration.

In embodiments the tiles are assembled with interlocking edges. In certain embodiments the tiles have thickened edges.

Another general aspect of the present invention is a body armor garment which includes a flexible support layer configured to be worn by a user and to cover a portion of the user's body and a plurality of rigid tiles bonded to the flexible support layer in a substantially adjacent pattern so as to form a mosaic outer layer protecting the portion of the user's body, the rigid tiles being made of a metal having an ultimate strength of >100 kpsi with elongation >10%, a specific gravity of <6, and a specific strength of >0.42.

In various embodiments the metal tiles are made of a titanium alloy comprising about approximately 6% aluminum and 4% vanadium by weight. In some embodiments the garment is flame resistant.

Certain embodiments further include an outer covering layer which is shaped so as to emulate a human anatomy shape appropriate to the portion of the user's body covered by the garment, thereby inhibiting visual detection of the presence of the garment. In some of these embodiments the outer covering layer includes tapered edges which help to obscure edges of the underlying layers. In some of these embodiments the outer layer includes a shaping layer made of a textile-supported foam or gel. In some of these embodiments the shaping layer is made of urethane foam. In other of these embodiments the shaping layer is covered by at least one stretchable fabric layer.

In various embodiments which include an outer covering layer the outer covering layer enhances the comfort of the user by cushioning edges of the underlying layers and preventing them from abrading the user's arms.

In certain embodiments the garment is configured to cover the torso of the user, and the garment includes an elastic cummerbund which maintains the garment in place on the torso of the user. And in some of these embodiments the cummerbund provides lumbar support to the user.

The features and advantages described herein are not all-inclusive and, in particular, many additional features and advantages will be apparent to one of ordinary skill in the art in view of the drawings, specification, and claims. Moreover, it should be noted that the language used in the specification has been principally selected for readability and instructional purposes, and not to limit the scope of the inventive subject matter.

BRIEF DESCRIPTION OF THE FIGURES

FIG. 2C is a side perspective view of a garment embodiment of the present invention which includes an elastic cummerbund that facilitates putting on and removing the body armor garment maintains the body armor while worn in an overlapping configuration;

FIG. 2D is a side perspective view of the garment embodiment of FIG. 2C showing the cummerbunds expanded;

DETAILED DESCRIPTION OF THE INVENTION

Figure 1A:
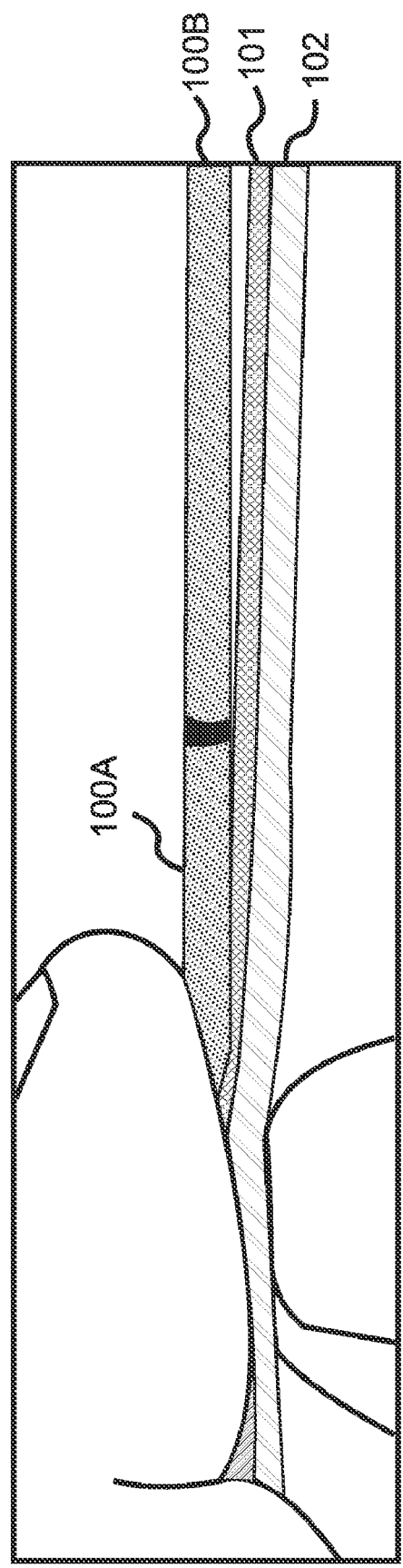
FIG. 1A is a cross-sectional side view of an embodiment of the present invention.

With reference to FIG. 1A, the present invention is a body armor assembly comprising tiles 100A-B having a specific strength of greater than 0.42 (in units of the cube root of kpsi) bonded to a flexible support "fabric" 102 in an adjoining, mosaic pattern. In the embodiment of FIG. 1A, the tiles 100A-B are approximately 2 mm thick and are made from "type 5" titanium alloy containing 6% Aluminum and 4% Vanadium, herein also designated as "grade 5" titanium or "TiAl6V4." It is useful to compare the properties of the titanium tiles 100A-B of FIG. 1A with steel tiles having an approximate thickness of 0.5 mm. Type 5 titanium has a 130 kpsi ultimate strength with 14% elongation, a modulus of 16.5 kpsi, and a specific gravity of 4.4. In contrast, steel tested by the inventor has an ultimate strength of 185 kpsi with 8% elongation, a modulus of 28 kpsi, and a specific gravity of 7.9.

As discussed above, the effectiveness of the type 5 titanium material used in the embodiment of FIG. 1A is due to its resistance to bending, since this is the type of loading that is imposed on a material by a ballistic impact. Because bending performance is proportional to the cube of plate thickness, we propose a new metric for characterizing the performance of a ballistic material which is equal to the cube root of the modulus of the material divided by its specific gravity. This new metric is referred to herein as the "specific strength" of a ballistic material. For the embodiment of FIG. 1A, the type 5 titanium has a specific strength of 0.58, as compared to 0.38 for steel (as measured in units of the cube root of kpsi). This difference in specific strength between the type 5 titanium used in the embodiment of FIG. 1A and 0.5 mm steel plate tested by the inventor is what provides the enhanced ballistic performance of the type 5 titanium at low relative thickness with respect to the diameter of the pistol bullet.

FIG. 1A is a cross-sectional view of an embodiment, showing the fabric layer 102 attached by a bonding layer 101 to a first tile 100A and slightly separated from a second tile 100B to which the fabric 102 has not yet been bonded. Perspective views of the embodiment from the tile side are provided in FIGS. 4-6. It can be seen from these figures that the tiles 100A-B in the embodiment of FIG. 1A are rectangular. In similar embodiments the tiles are square, triangular, hexagonal, or any other shape that provides convenient adjacent placement on the flexible "fabric" layer 102. Typical largest dimensions of the tiles 100 range from 10 mm to 50 mm in various embodiments.

In the embodiment of FIG. 1A, the fabric layer 102 is a layer of woven para-aramid. Similar embodiments use a flexible "fabric" layer 102 which includes carbon nanotube embedded ultra-high molecular weight polyethylene (UHMWPE) UD-laminate, sheer thickening fluid treated para-aramid, STF-treated Kevlar™, and/or various resin alternatives known in the art.

Figure 1B:
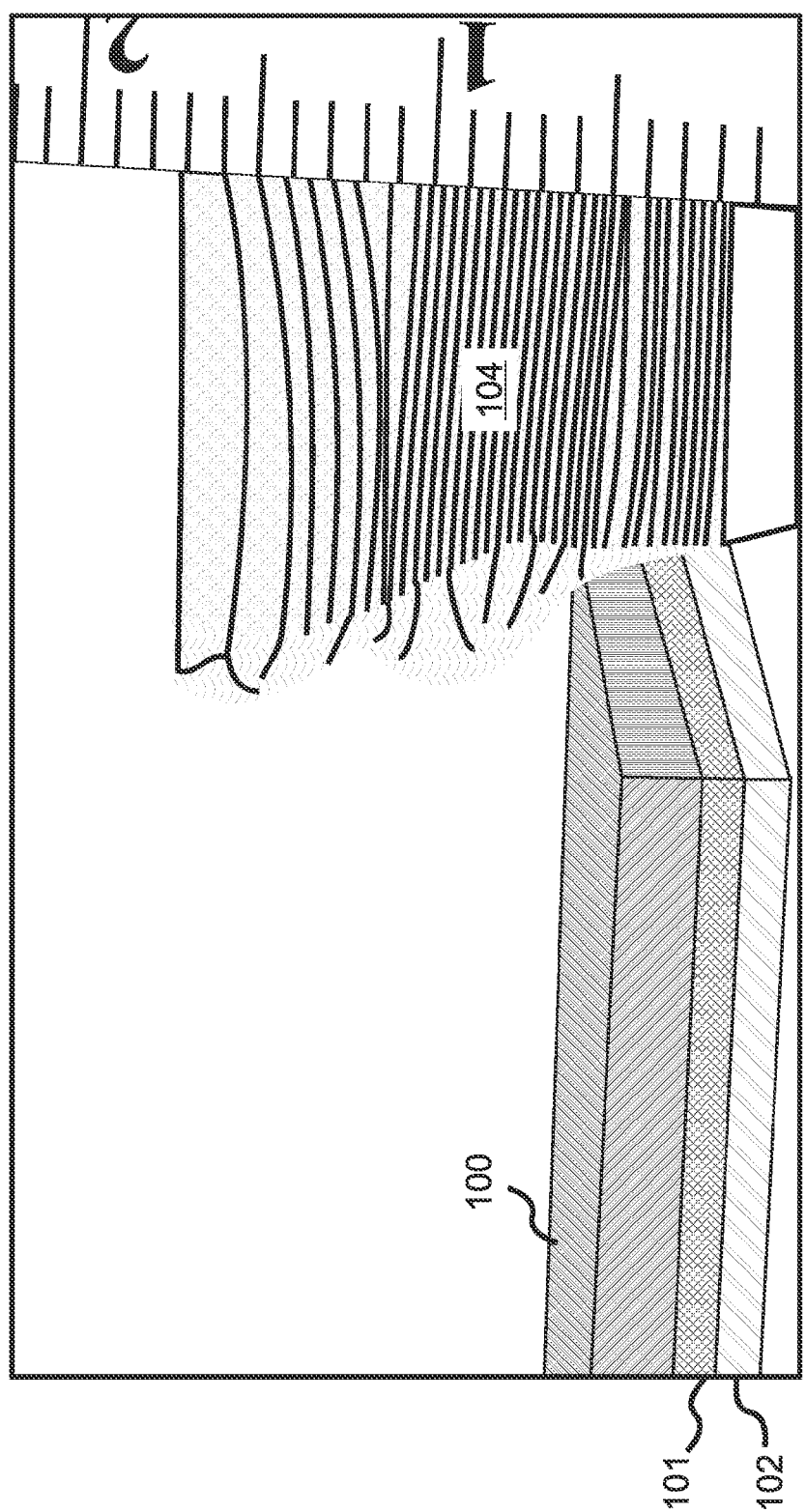
FIG. 1B is a perspective view which compares the thickness of a typical prior art body armor assembly with an embodiment of the present invention.

In various embodiments, the tiles 100A-B are approximately 2 mm thick, and the entire assembly is less than 4.5 mm thick, as shown in FIG. 1A and FIG. 1B. In particular, FIG. 1B compares a cross section of the embodiment of FIG. 1A with a cross section of a typical body armor assembly of the prior art 104 which provides somewhat comparable ballistic and spike protection, but has a thickness of approximately 16 mm and does not provide knife resistance.

Figure 1C:
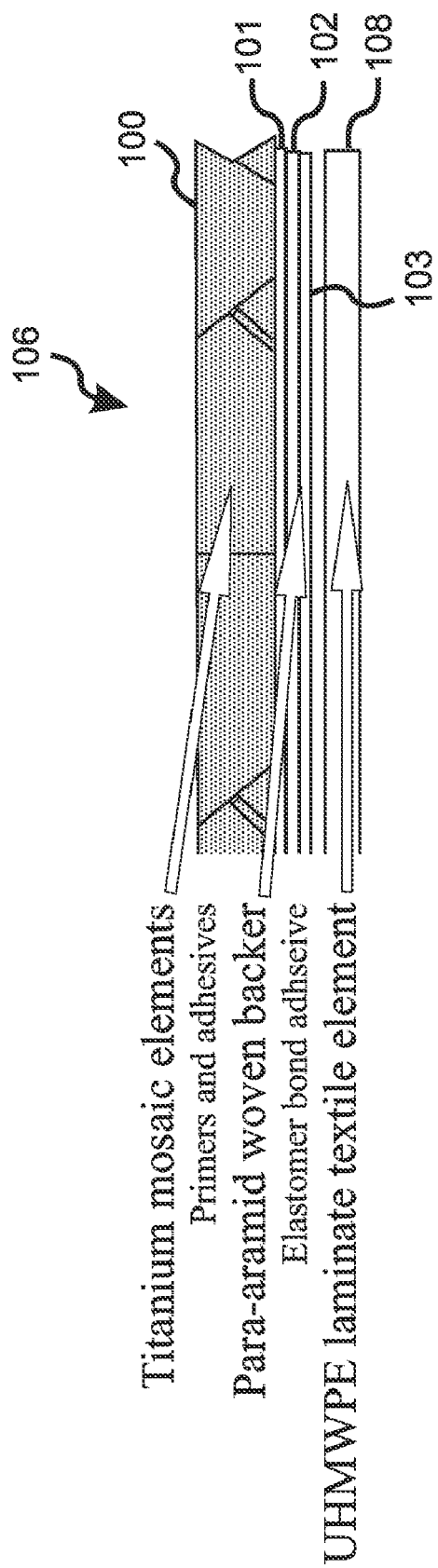
FIG. 1C is a side cross-sectional view of an embodiment in which type-5 titanium elements are arranged in a mosaic pattern with an interlocking edge configuration, the embodiment also including a "fiber-pack" layer attached behind a woven backing layer.

FIG. 1C is a side cross-sectional view of an embodiment 106 in which the type-5 titanium elements 100 are arranged in a mosaic pattern with an interlocking edge configuration, so as to maintain flexibility while preventing penetration at the junctures between the elements. The embodiment 600 of FIG. 1C also includes a "fiber-pack" layer 108 which is attached by an elastomer bond adhesive 103 behind the Para-aramid woven backing layer 102. In the embodiment 106 of FIG. 1C, the fiber-pack layer 108 is a soft pressed UHMWPE unidirectional laminate to which a flexing process has been applied that makes it soft and flexible. Some embodiments include Carbon Nano-tube (CNT) felts in the soft-pressed fiber pack 108 so as to provide substantially equal protection at reduced mass and thickness. Other embodiments use Shear Thickening Fluid (STF) treated para-aramid as a woven alternative to soft-pressed UHMWPE as the fiber-pack material 108.

Figure 1F:
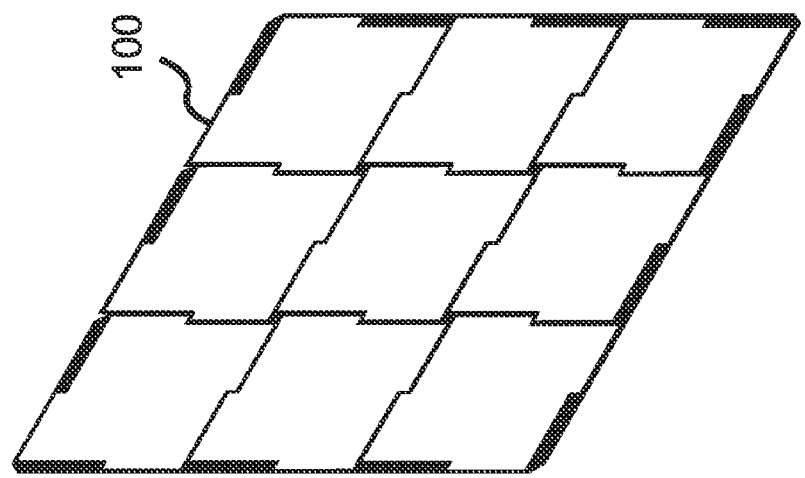
FIGS. 1D through 1F are front, side, and perspective views respectively of an embodiment which includes a mosaic interlocking pattern of type-5 titanium elements.
Figure 1E:
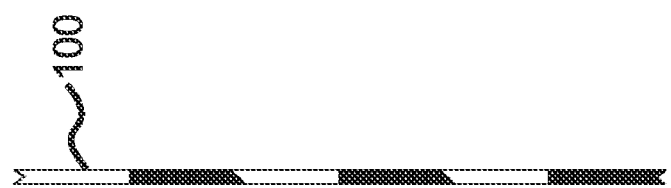
Figure 1D:
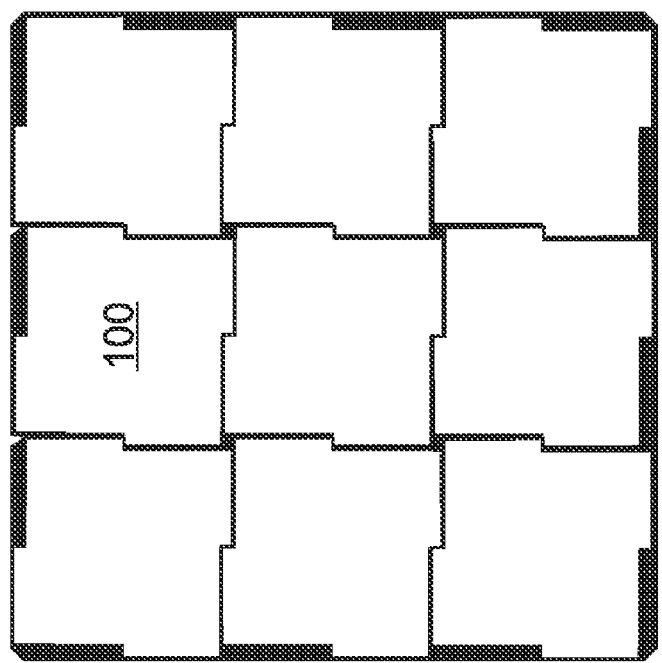

FIGS. 1D through 1F are front, side, and perspective views respectively which illustrate the mosaic interlocking pattern of the type-5 titanium elements 100 in an embodiment of the present invention. In some embodiment, edges of the titanium elements 100 are increased in thickness so as to stop oblique ballistic hits. In some of these embodiments, the edges are about approximately 6 mm thick.

Figure 2A:
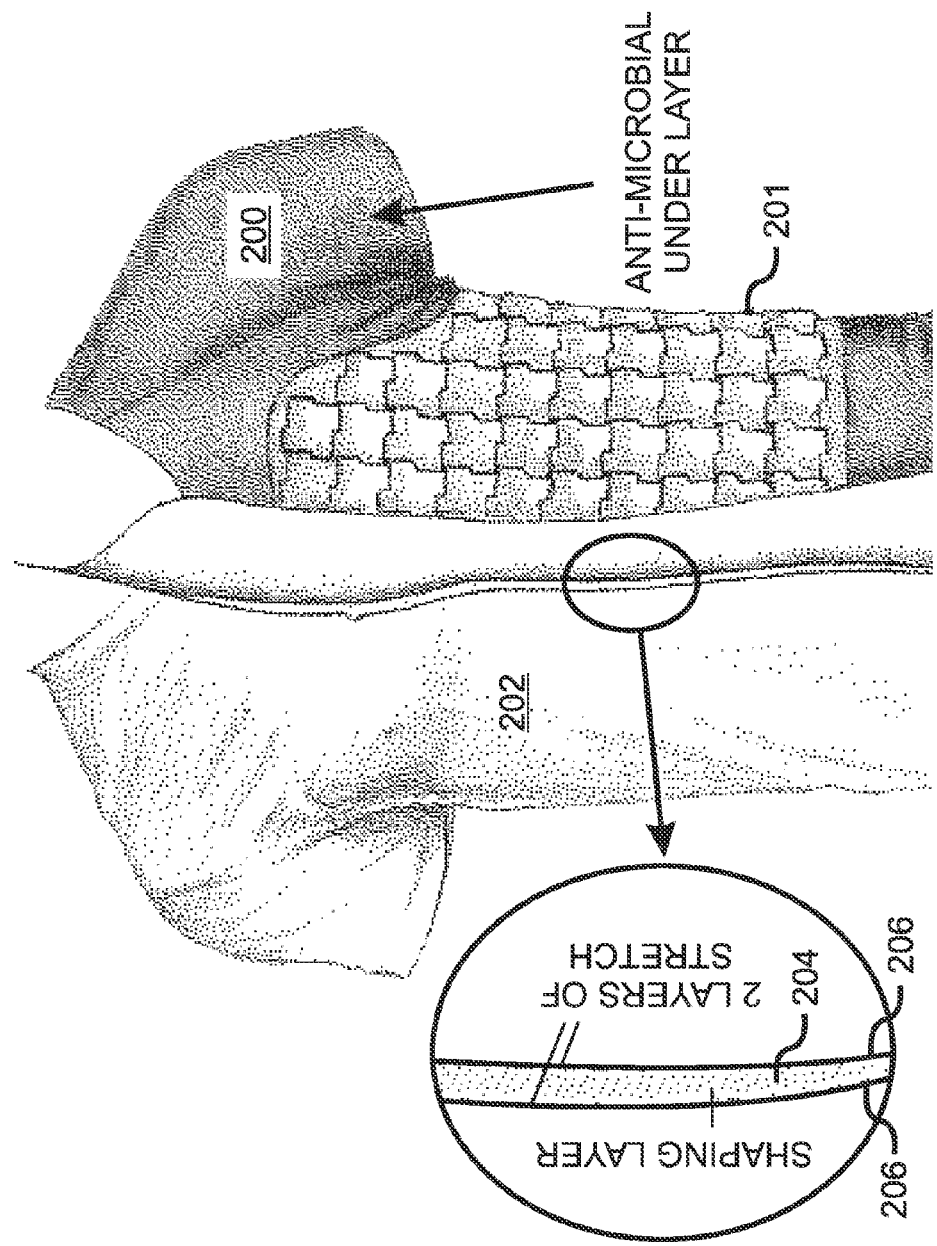
FIG. 2A is a cut-away illustration of a garment embodiment of the present invention which includes an anti-microbial inner layer beneath an armor layer and an outer cover layer that takes on the silhouette of a human torso, thereby helping to conceal the armor layer.

With reference to FIG. 2A, some embodiments combine an inner layer 200 having anti-microbial and high moisture transport properties with an outer layer 202 having low friction and high stretch. Anti-microbial properties can be provided, for example, by treatment of the inner layer 200 with a hydantoin compound which can be treated with a chlorine solution so as to form chloramine. FIG. 2A is a cut-away illustration of a garment embodiment of the present invention which includes an anti-microbial inner layer 200 beneath the armor layer 201. In various embodiments, the chloramine can provide 3-log gram negative bacteria kill times in less than 15 minutes, and can address spores like C-diff in under 60 minutes. In some of these embodiments the chloramine can be maintained and recharged as part of normal laundering.

The inner layer 200 in various embodiments has a low coefficient of friction, and the innermost ply of the inner layer 200 has high moisture-wicking properties, so as to carry moisture away from the skin of the wearer.

The embodiment of FIG. 2A also includes an outer cover layer 202 that takes on the silhouette of the morphology of a human torso, thereby masking the outline of the edges of the body armor 201 with the expected lines of the shoulder blades and chest. This outer layer 202 serves to camouflage the unnatural profile of the protective garment made from the body armor assembly 201. In some embodiments, the outer layer 202 includes a shaping layer 204 made of a textile-supported foam or gel and covered by stretchable fabric layers 206. In certain embodiments the outer layer 202 has tapered edges for even better concealment of the body armor. In some embodiments the outer layer 202 is manufactured from a textile supporting a flexible foam component. Urethane foams are used in some of these embodiments due to their favorable properties of flexibility, elasticity and durability. Gels are used in other embodiments.

Figure 2B:
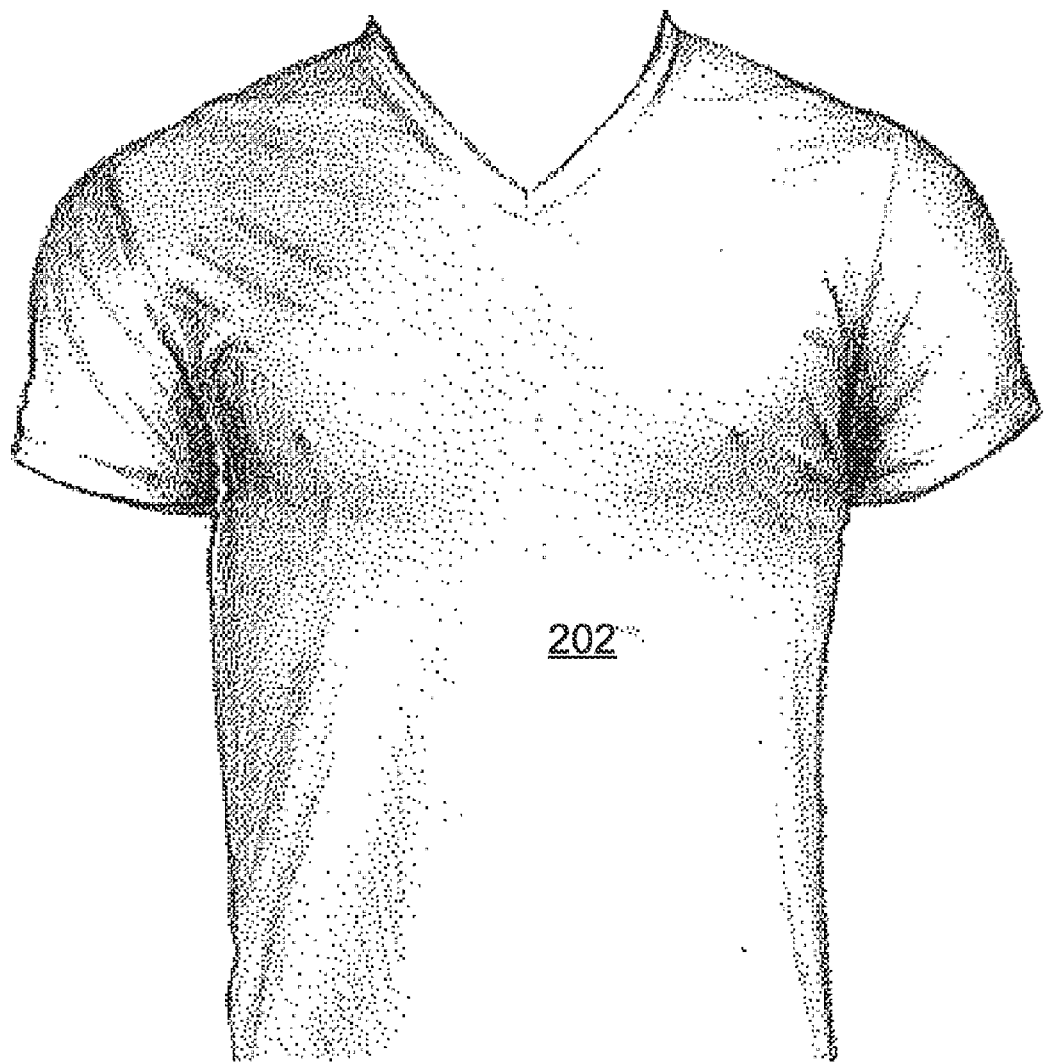
FIG. 2B is a perspective view of the outer layer of FIG. 2A covered by a knit shirt, illustrating the concealment of the armor layer underneath.

In FIG. 2A, the outer layer 202 is a molded layer of spacer textile which simulates the chest surface of the wearer. Because human anatomical detail is copied in the outer layer 202, an observer is not able to distinguish the body armor 201 even under a knit shirt. This is illustrated in FIG. 2B. In addition to hiding the body armor 106, in various embodiments the outer layer 202 also enhances the comfort of the wearer by cushioning the edges of the armor panel 106 and preventing it from abrading or digging into the user's arms.

The garment embodiment of the present invention illustrated in FIG. 2C includes an elastic cummerbund 208 that facilitates putting on and removing the body armor garment 201, and which maintains the body armor 201 on the wearer in a configuration of overlapping protection without hindering the mobility of the wearer. In some embodiments the cummerbund 208 also provides lumbar support to the wearer. FIG. 2D illustrates the garment embodiment of FIG. 2C with the cummerbunds 208 expanded.

Figure 3A:
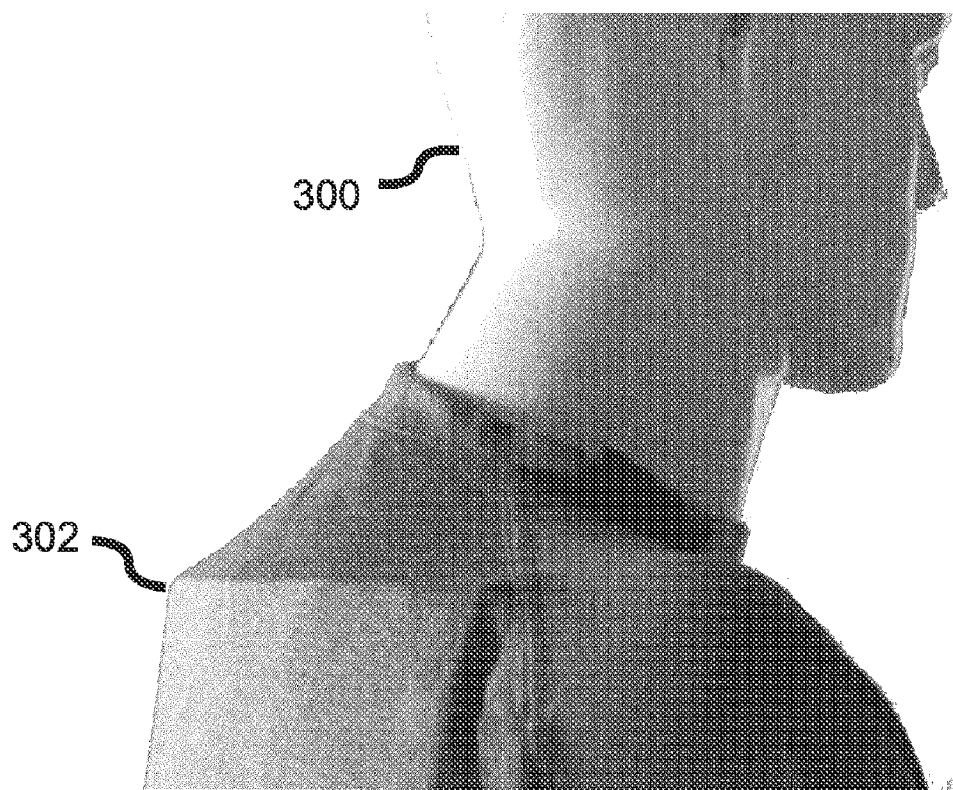
FIG. 3A is a perspective view of a mannequin wearing a T-shirt over torso body armor of the prior art.
Figure 3C:
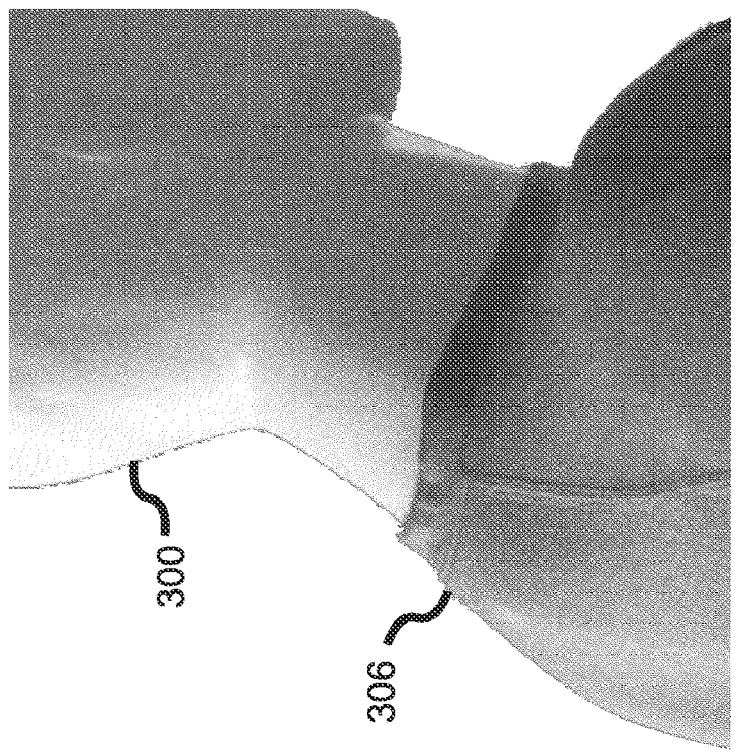
FIG. 3C is a perspective view of the mannequin of FIG. 3B wearing the embodiment of FIG. 2A, which includes a camouflage molded outer layer.
Figure 3B:
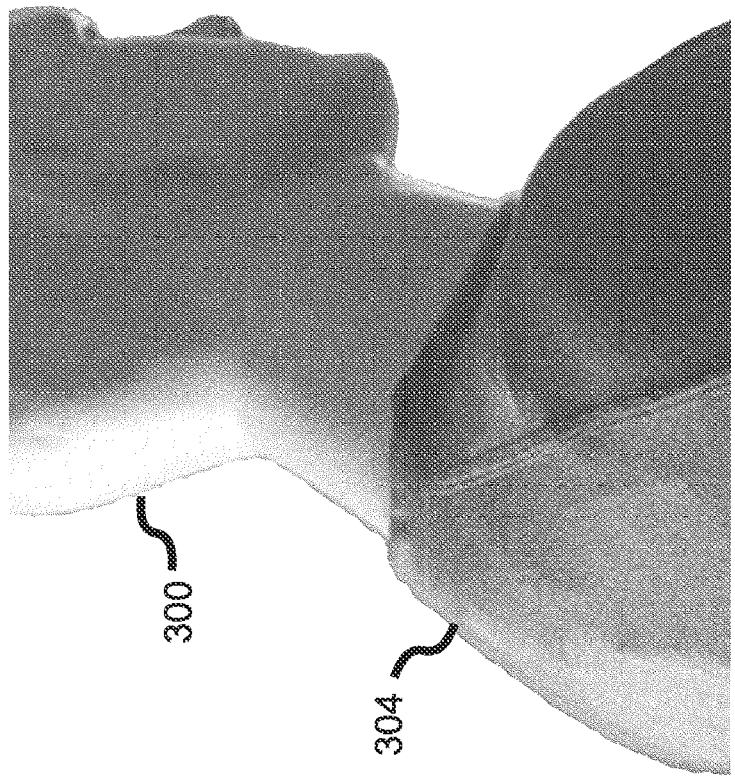
FIG. 3B is a perspective view of a mannequin wearing the embodiment of FIG. 1B beneath the T-shirt of FIG. 3A.

The ability of the present invention to be concealed is illustrated in FIGS. 3A through 3C. FIG. 3A illustrates the difficulty of concealing some armor systems of the prior art. Even though the user 300 has covered the armor system with a T-shirt, the edge 302 of the armor system is clearly visible. FIG. 3B is a perspective illustration of a mannequin 300 wearing the embodiment of FIG. 1B beneath the T-shirt of FIG. 3A. From the figure, it can be seen that the body armor 304 in FIG. 3B is almost imperceptible beneath the T-shirt. FIG. 3C is a perspective illustration of the mannequin 300 of FIG. 3B wearing the embodiment of FIG. 2A, which includes a camouflage molded outer layer 202. In this embodiment the presence of the armor system is nearly impossible to detect beneath the T-shirt.

Embodiments of the present invention include flame resistant material which encapsulates any flammable materials, such as the UHMWPE fiber pack 108 of FIG. 1C. In some embodiments, seaming and flame-resistant coatings are also included. Various of these embodiments provide ASTM D6413 flame resistance of less than 50% consumption and no melt/drip. The titanium elements 100 of the system are not flammable, and embodiments of the backing material 102 such as the para-aramid backing material 102 of FIG. 1C, are also not flammable. Embodiments of the inner layer 200 and outer covering 202 are also non-flammable.

Figure 4:
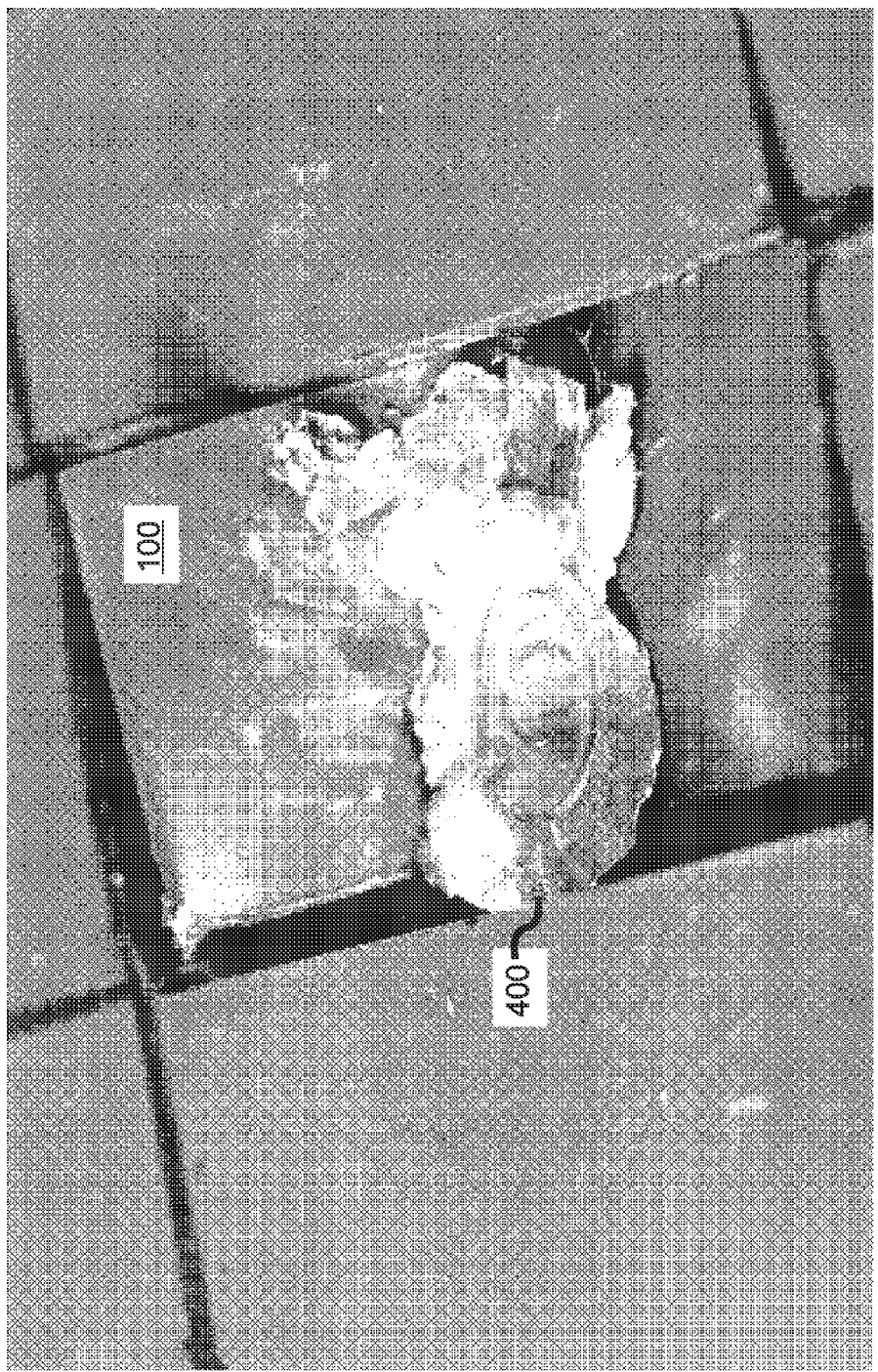
FIG. 4 illustrates the result of an impact upon a tile of an embodiment of the present invention by a round nose, 124 grain, 9 mm "full metal jacket" ("FMJ") projectile traveling at 1350 feet-per-second.

FIG. 4 illustrates the result of an impact upon the embodiment of FIG. 1A of a round nose, 124 grain, 9 mm "full metal jacket" ("FMJ") projectile 400 traveling at 1350 feet-per-second. While the impacted type 5 titanium tile 100 has been somewhat damaged, the projectile 400 has not penetrated the tile 100. In a similar test, the embodiment of FIG. 1A defeated a .357 SIG round traveling at 1475 fps, and the baseline panel with 1 mm additional textile had a 44 mm magnum backface signature of 35 mm.

In general, embodiments of the present invention using type 5 titanium tiles of approximately 2 mm thickness provide V50 protection against round nose, 124 grain, 9 mm "full metal jacket" ("FMJ") projectiles and .357 SIG projectiles traveling at velocities up to 1500 feet-per-second and more.

In comparison, tests performed on a similar assembly using 0.5 mm high-grade steel tiles provided a V50 for the same projectiles of only 100 feet-per-second. While the 2 mm type 5 titanium tiles of the FIG. 4 embodiment are twice as heavy as the 0.5 mm steel tiles, they provide a V50 which is increased by a factor of 15 in velocity, or a factor of 225 in energy, as compared to the 0.5 mm steel tiles.

The performance of the embodiment of FIG. 4 in resisting penetration of high velocity, large diameter projectiles 400 was unexpected according to the teachings of the prior art, including U.S. Pat. No. 7,393,588 and US publication 2008-0104735 A1 filed by the present inventor and incorporated herein by reference for all purposes. Examples included therein, and other tests performed on body armor assemblies constructed according to prior art teachings, using tiles made from high grade steel and/or a variety of other metal and ceramic materials, either separately or in combination, had consistently indicated that V50 performance at velocities approaching 1000 feet-per-second could only be achieved if the thickness of the tiles was at least approximately equal to the diameter of the projectile.

Therefore, until the present invention, it was by no means obvious that a mosaic body armor assembly such as the embodiment of FIG. 1A could resist penetration by a high velocity projectile 400 having a diameter of 9 mm, since the tiles 100 were only 2 mm thick.

Figure 5:
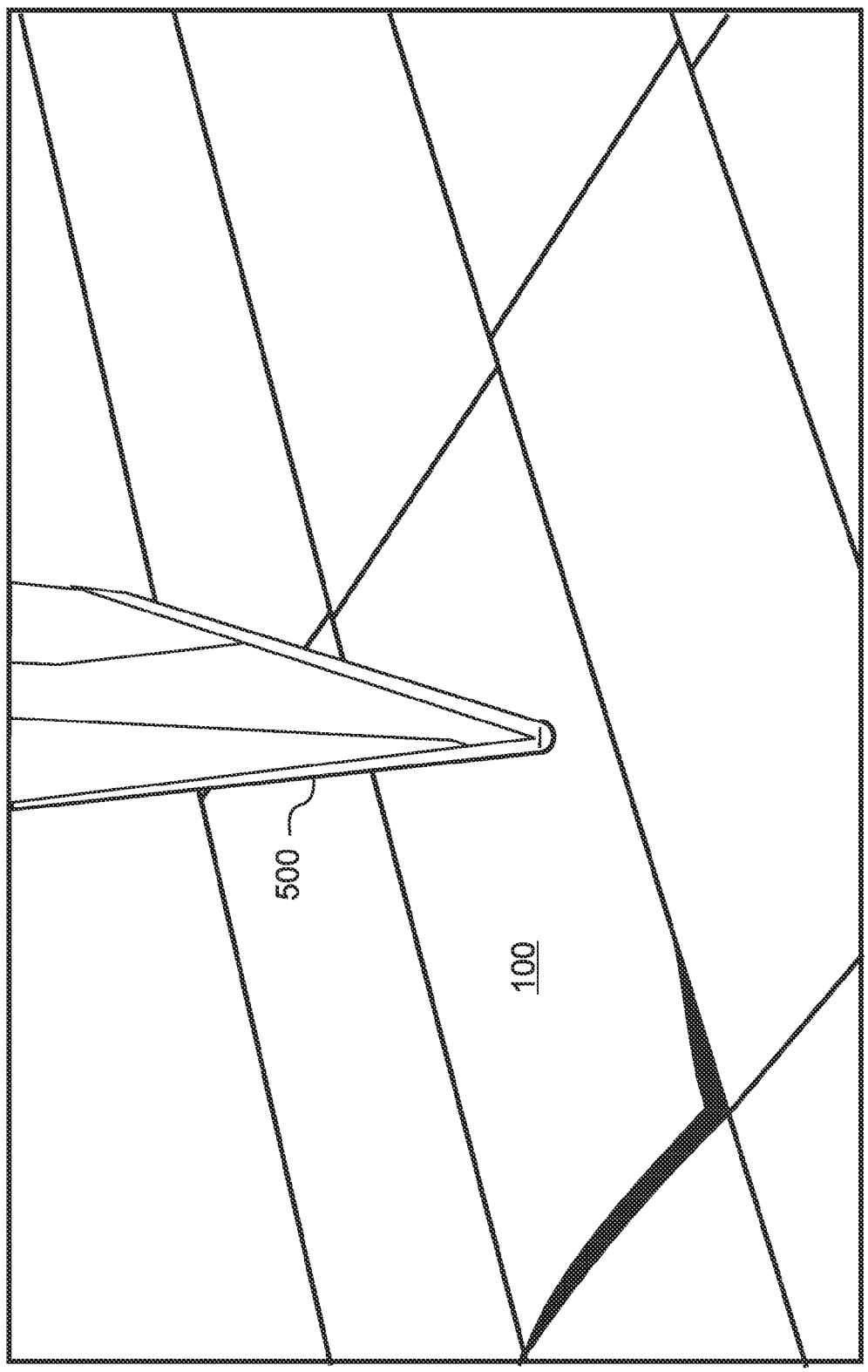
FIG. 5 illustrates the result of applying a P1 knife to a tile of the embodiment of FIG. 4 using 65 Jewels of force.
Figure 6:
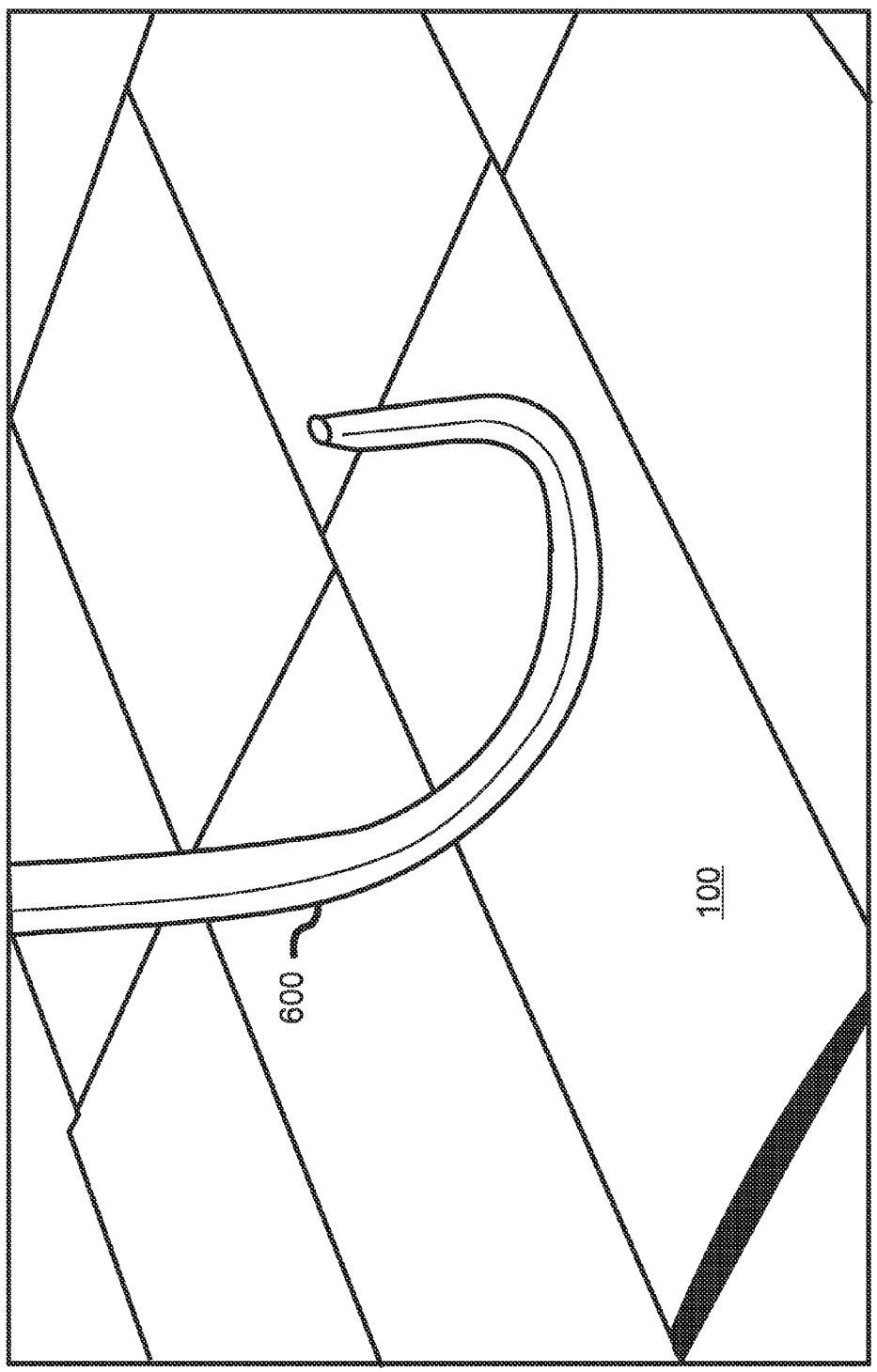
FIG. 6 illustrates the result of applying a pointed spike to a tile of the embodiment of FIG. 4 using 65 Jewels of force.

The body armor assembly of the present invention provides protection against stabbing threats as well as projectile impacts. FIG. 5 illustrates application of an E50 stab test using a P1A knife 500 with 65 Joules of force (Protection Level 3 E2) to a tile 100 of the embodiment of FIG. 1A. As shown in the Figure, there is no penetration of the tile 100. Similarly, FIG. 6 illustrates the affect of applying a Level 3, E2 spike 600 to a tile 100 of the embodiment of FIG. 1A with 65 Joules of force. Once again, there is no penetration of the tile 100, although the spike 600 is bent.

Various embodiments provide protection against even higher threat levels, such as Stab Resistance of Personal Body Armor NIJ Standard 0115.00, Protection Level 3 (Edged Blade and Spike Protection Classes), NIJ 0101.06 Threat Level II with specified special threat rounds, and NIJ Standard-0101.06 Type IIIA (.357 SIG and .44 Magnum).

The foregoing description of the embodiments of the invention has been presented for the purposes of illustration and description. It is not intended to be exhaustive or to limit the invention to the precise form disclosed. Many modifications and variations are possible in light of this disclosure. It is intended that the scope of the invention be limited not by this detailed description, but rather by the claims appended hereto.

What is claimed is:

1. An assembly for constructing body armor, the assembly comprising:
   a flexible support layer; and
   a plurality of rigid tiles bonded to the flexible support layer in a substantially adjacent pattern so as to form a mosaic protection layer, the rigid tiles being made of a metal alloy having an ultimate strength of >100 kpsi with elongation >10%, a specific gravity of <6, and a specific strength of >0.42.

2. The assembly of claim 1, wherein the rigid tiles are made of a titanium weight.

3. The assembly of claim 1, wherein the support layer includes woven para-aramid.

4. The assembly of claim 1, wherein the support layer includes STF-treated Kevlar™.

5. The assembly of claim 1, further comprising a backing layer.

6. The assembly of claim 5, wherein the backing layer includes sheer thickening fluid treated para-aramid.

7. The assembly of claim 5, wherein the backing layer includes ultra-high molecular weight polyethylene (UHMWPE) UD-laminate.

8. The assembly of claim 5, wherein the backing layer includes carbon nanotubes.

9. The assembly of claim 1, further comprising an inner layer having anti-microbial properties.

10. The assembly of claim 9, wherein the anti-microbial properties arise at least partly from bonding a hydantoin compound to a surface of the inner layer, the hydantoin being treatable with a chlorine solution so as to form chloramine.

11. The assembly of claim 9, wherein the inner layer includes high moisture transport properties.

12. The assembly of claim 9, wherein the inner layer includes a low friction, high-stretch layer.

13. The assembly of claim 1, wherein the tiles are about approximately 2 mm thick.

14. The assembly of claim 1, wherein the tiles are one of square, rectangular, triangular, and hexagonal.

15. The assembly of claim 1, wherein the largest dimension of the tiles is between 10 mm and 50 mm.

16. The assembly of claim 1, wherein the assembly has a thickness of less than 5 mm.

17. The assembly of claim 1, wherein the assembly is able to resist penetration by a round nose, 124 grain, 9 mm "full metal jacket" ("FMJ") projectile with a V50 of at least 1000 feet-per-second.

18. The assembly of claim 1, wherein the assembly is able to resist P1A Knife and Spike assaults at 65 Joules force (Level 3 E2) with no penetration.

19. The assembly of claim 1, wherein the tiles are assembled with interlocking edges.

20. The assembly of claim 1, wherein the tiles have thickened edges.

21. A body armor garment, comprising:
   a flexible support layer configured to be worn by a user and to cover a portion of the user's body; and
   a plurality of rigid tiles bonded to the flexible support layer in a substantially adjacent pattern so as to form a mosaic outer layer protecting the portion of the user's body, the rigid tiles being made of a metal having an ultimate strength of >100 kpsi with elongation>10%, a specific gravity of <6, and a specific strength of >0.42.

22. The garment of claim 21, wherein the metal tiles are made of a titanium alloy comprising about approximately 6% aluminum and 4% vanadium by weight.

23. The garment of claim 21, wherein the garment is flame resistant.

24. The garment of claim 21, further comprising an outer covering layer which is shaped so as to emulate a human anatomy shape appropriate to the portion of the user's body covered by the garment, thereby inhibiting visual detection of the presence of the garment.

25. The garment of claim 24, wherein the outer covering layer includes tapered edges which help to obscure edges of the underlying layers.

26. The garment of claim 25, wherein the outer layer includes a shaping layer made of a textile-supported foam or gel.

27. The garment of claim 26, wherein the shaping layer is made of urethane foam.

28. The garment of claim 26, wherein the shaping layer is covered by at least one stretchable fabric layer.

29. The garment of claim 24, wherein the outer covering layer enhances the comfort of the user by cushioning edges of the underlying layers and preventing them from abrading the user's arms.

30. The garment of claim 21, wherein the garment is configured to cover the torso of the user, and the garment includes an elastic cummerbund which maintains the garment in place on the torso of the user.

31. The garment of claim 30, wherein the cummerbund provides lumbar support to the user.

* * * * *

UNITED STATES PATENT AND TRADEMARK OFFICE
CERTIFICATE OF CORRECTION

| | |
|---|---|
| PATENT NO. | : 8,291,808 B2 |
| APPLICATION NO. | : 13/082442 |
| DATED | : October 23, 2012 |
| INVENTOR(S) | : Charles A. Howland |

It is certified that error appears in the above-identified patent and that said Letters Patent is hereby corrected as shown below:

In the Claims

Claim 2, column 9, line 15, insert between "titanium" and "weight" -- alloy comprising about approximately 6% aluminum and 4% vanadium by --

Signed and Sealed this
Ninth Day of July, 2013

Teresa Stanek Rea
*Acting Director of the United States Patent and Trademark Office*